Aug. 10, 1965  C. G. C. SKOGH  3,199,958
TELESCOPING TOWER FOR FURFURAL PRODUCTION
Filed Dec. 11, 1959  2 Sheets-Sheet 1
FIG. I
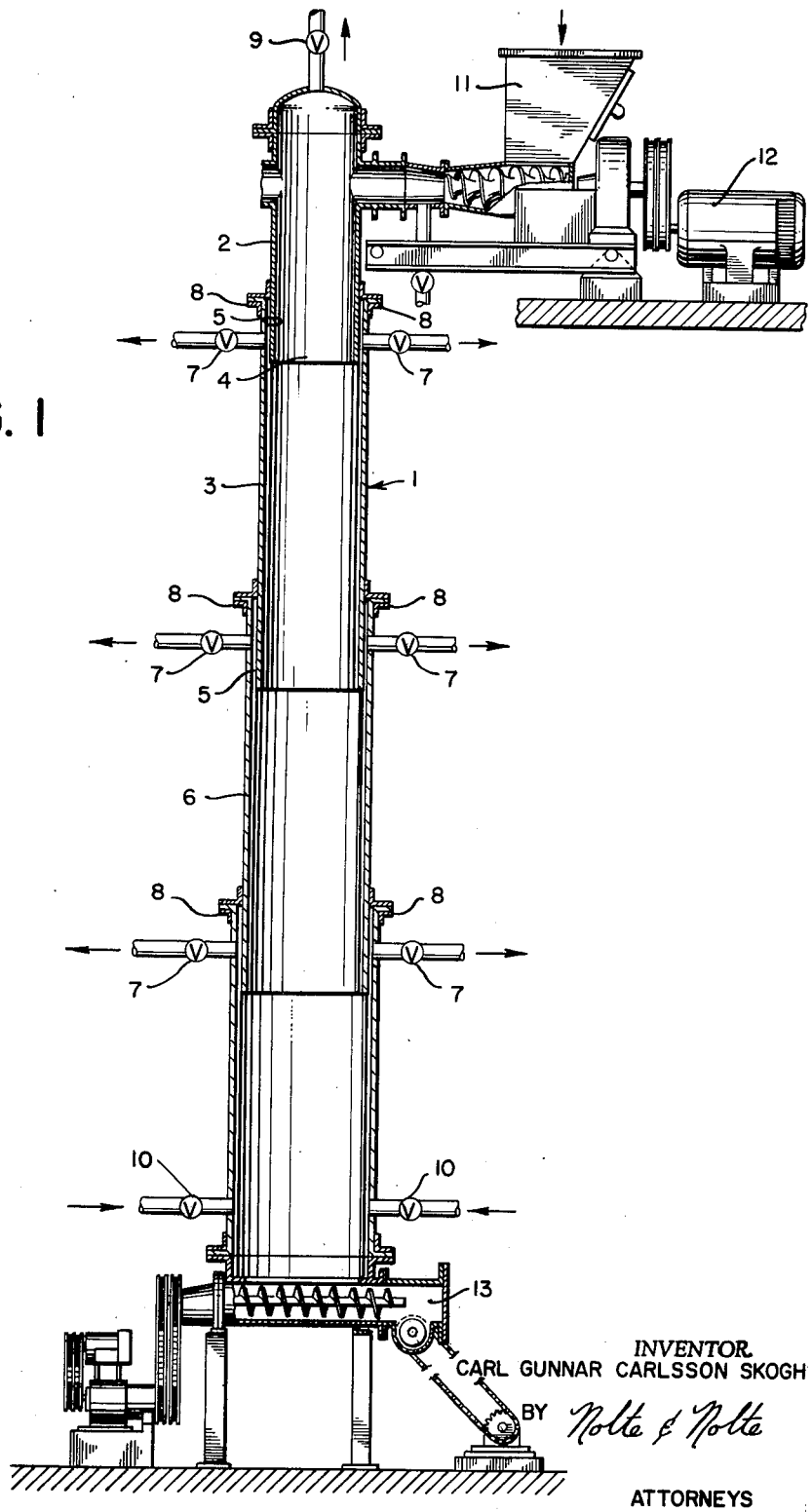
INVENTOR.
CARL GUNNAR CARLSSON SKOGH
BY Nolte & Nolte
ATTORNEYS Aug. 10, 1965　　　C. G. C. SKOGH　　　3,199,958
TELESCOPING TOWER FOR FURFURAL PRODUCTION
Filed Dec. 11, 1959　　　　　　　　　　2 Sheets-Sheet 2
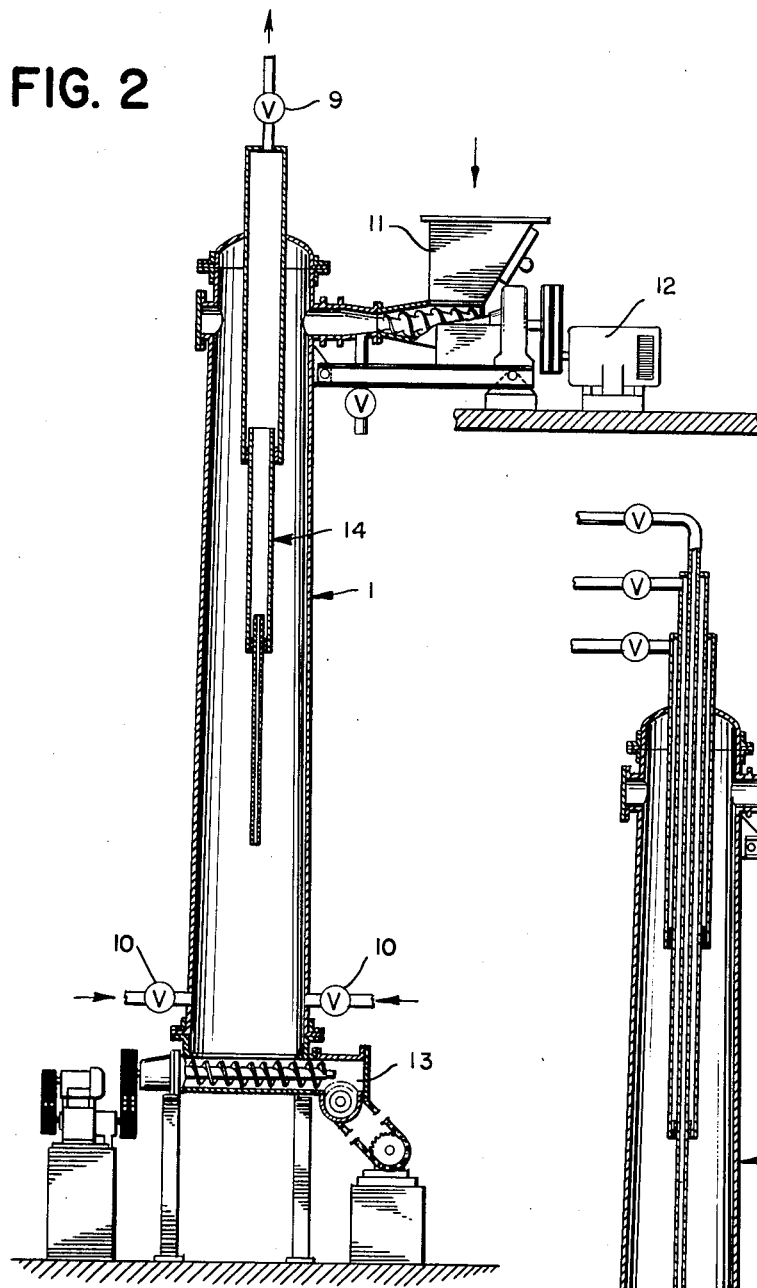
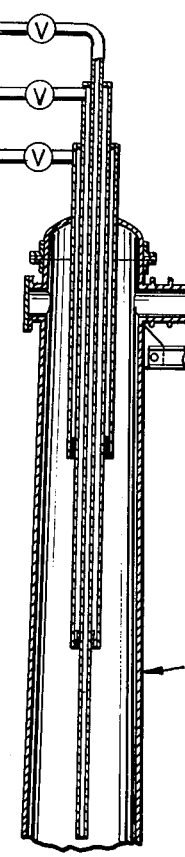
INVENTOR.
CARL GUNNAR CARLSSON SKOGH
BY　*Nolte & Nolte*
ATTORNEYS United States Patent Office 3,199,958
Patented Aug. 10, 1965

3,199,958
TELESCOPING TOWER FOR FURFURAL
PRODUCTION
Carl Gunnar Carlsson Skogh, Stackvagen 20B,
Sollentuna, Sweden
Filed Dec. 11, 1959, Ser. No. 859,008
Claims priority, application Sweden, Dec. 17, 1958,
11,714/58; Dec. 18, 1959, 10,821/59
2 Claims. (Cl. 23—283)

In a process for the continuous formation of furfural from solid pentosan- and pentose-bearing materials the raw material is fed continuously into, through and out of a vertical reaction vessel from an ingress opening at the top of the vessel to an outlet opening at its base. In the reaction vessel the furfural-yielding material is treated with steam of suitable temperature, which is passing in counterflow to the direction of flow of the furfural-yielding material, through the vessel from an inlet adjacent to said outlet opening and is withdrawn through an outlet opening on a level between said inlet opening and the top of the vessel. In order to heat the raw material to a temperature suitable for the recovery of furfural, water vapor is also blown in through a pipe in the ingress channel.

As pentosan- and pentose-bearing raw materials the following may be mentioned by the way of example: Alfa (Morocco), barley hulls (roasted), bean hulls, beet pulp, buckwheat hulls, corn bran, corn husks, corn cobs, flax chaff, olive press cake, peanut shells (West Africa), pecan outer shells, soybean bran, soybean hulls, sudan grass, sunflower seed hulls, wheat bran, oats husks, oats chaff, vetiver straw (Morocco), chestnut wood, red alder, sorbtree, aspen, basswood, birch (paper, river, yellow), coigue, cottonwood (southern), elm (white American), maple (red, silver, sugar), oak (blackjack, chestnut, overcup, post), bitter pecan, poplar (white, yellow), black willow. Some of these materials may be used without any mechanical disintegration and the coarser ones may be chopped. The water vapor (live steam) admitted to the system has a temperature of 120-250° C. and the corresponding pressure; the temperature is chosen according to the kind of the raw material used and the chemical reaction conditions prevailing.

Irrespective of whether the process is carried out in the way described above or the formation of furfural by hydrolysis with water vapor is carried out in another way, it is possible to discern various reaction stages in the process, the three following being the main ones: A first stage beginning in the neighbourhood of the ingress opening as soon as the material has been heated to the temperature required. The principal chemical reaction in this first stage is the formation of acid by the action of the sufficiently high temperature in this stage, mainly acetic acid, otherwise acid must be added. The acid thus formed is in general sufficient to bring about the hydrolysis of the pentosanes contained in the raw material to pentoses and further to furfural. After the acid formation stage there is the reaction stage in which the main part of the furfural is formed, and in the third stage, which follows after said second stage, furfural is formed from those pentosanes which will be more slowly hydrolysed.

It is important that the furfural is withdrawn from the reaction mixture as soon as possible after its formation, i.e. that it does not remain in the reaction pulp or passes through the zones of the second and the first reaction stage mentioned above; for it has turned out that if the furfural remains for any longer time in the reaction pulp or passes through the reaction pulp in the second and the first of said reaction zones, especially through the first zone in which acid is formed, losses are caused, by reaction, e.g. condensation, between the furfural and other constituents contained in the reaction material or polymerization of the furfural under the influence of the catalytic effect of other constituents contained in the reaction material.

It may also be mentioned that it is essential that the vapor stream is withdrawn from the reaction vessel before it is entering into the first reaction zone in which the main acid formation occurs, since otherwise the acid formed would be blown out of the reaction vessel and consequently would not have any opportunity to cause the said hydrolysis in the following stages. Of course also in the third reaction stage losses of furfural occur but these losses are not as high as the losses would be in the second and especially in the first reaction stage.

Up to the present time it has not been possible in a technically feasible way to remove the furfural from the reaction vessel at the furfural formation zone, and this was substantially due to the fact that it is very difficult to prevent the reaction pulp from clogging the oulets if these are located below the top level of the reaction pulp. One object of my present invention is to provide a process whereby these problems are satisfactorily solved. Thus my present invention relates to an improved method for manufacturing furfural in a continuous process, solid pentosan- and pentose bearing raw material being continuously fed through a reaction vessel or digester counter to a current of steam and the process is characterized by the fact that the furfural formed, without delay, is removed in vapor form from the reaction vessel where its cross section area is suddenly increasing to the direction of the movement of the reaction pulp. Another object of my invention is to provide an apparatus for carrying out said process of the type set forth hereinbelow.

The apparatus according to the present invention comprises a substantially vertical reaction vessel, a feeder connected with an ingress opening at the top of the reaction vessel and an outlet for discharging the reaction residue at the lower end of the reaction vessel after the volatile organic substances, such as furfural have to be removed therefrom. Further the apparatus according to the present invention is provided with an inlet pipe for admitting water vapor into the reaction vessel which pipe is placed in proximity to said outlet for discharge of residue. The apparatus is according to the present invention characterized by the fact that the cross section area of the reaction vessel on one or more levels are suddenly increasing in the direction of the flow of the reaction mixture in the vessel. At said levels the reaction vessel is provided with vapor outlets in which valves are placed.

For a better understanding of the nature, scope and characteristic features of my present invention, reference will now be made to the following description and the accompanying drawings in which FIG. 1 is a diagrammatic view of an apparatus embodying one form of my invention and by means of which my present process may be carried out; and FIG. 2 is a sectional view showing a modification of my apparatus for the purpose of continuously treating the furfural yielding material.

In FIG. 3 a further modification is shown.

The reaction vessel 1 of the the present apparatus, in the form shown in FIG. 1, comprises a plurality of pipes or sections, which are disposed substantially concentrically to each other. The top section has the least cross section area and the following have successive larger cross section area. The lower part of the top section 2 is inserted into the following section 3 at 4 and since the section 3, as mentioned above, has a larger cross section area than the section 2, there is an annular space 5 between the lower part of section 2 and the top part of section 3. Similarly at the junction of section 3 and section 6 there is also an annular space 5 between the lower part of the section 3 and top part of section 6. In FIG. 1 the reaction vessel consists of three sections each with increasing cross section areas from the top of the base, but it may of course also be provided with only two or with more than three sections and the sections may of course be cylindrical or of a non circular cross section.

It is of course not necessary that at the junction between the different sections there are concentric annular spaces 5. Neither is it necessary that these spaces surround the whole periphery of the section with a smaller cross section area but the embodiment shown in FIG. 1 exhibits some advantages in regard of construction and management which makes it suitable for the purpose of explaining the nature of the present invention. The essential feature of the apparatus according to the present invention is, however, that in order to avoid clogging of the vapor oulets, the cross section area of the reaction vessel suddenly increases at the levels on which the vapor outlets are connected to the digester. The spaces at the junction between the different sections can also, if desired, be shielded with a screen or a perforated plate in order further to minimize the risk for clogging of the vapor outlets.

From the said spaces 5 the vaporous rection products are withdrawn through the vapor outlet which is provided with a control valve 7. The vapor thus withdrawn and containing the furfural formed in the corresponding section, is conveyed to any suitable distillation apparatus, not shown, which is well known in the art, and which, of itself, forms no part of my present invention. In this distillation apparatus concentrated furfural may be recovered.

In producing furfural in a continuous process there is often formed resinous products which tend to deposit in or near the vapor outlets. In the embodiment shown in FIG. 1 these depositions are formed on the walls of the spaces 5 and may clog the said spaces. It is therefore necessary, at intervals, to remove these depositions and in order to facilitate this cleaning of the apparatus the lower part of each section, which is inserted into the top part of the next section, is removable and exchangeable. This may be obtained by flanging the lower part of every section to the main part of the section. See reference numeral 8 in FIG. 1, for example. The length of the inserted part may be varied by connecting a longer or shorter lower part or the flanged part may be telescoping and in this way its length may easily be varied. This possibility to vary the length of the inserted lower part of each section is necessary if the apparatus has to be used for different raw materials, for the reaction time in the different zones varies substantially in using different starting materials.

During the process gases are also formed, which although they seem to be harmless as regards their chemical influence on the reaction, should be withdrawn as soon as possible in order not in interfere with the pressure or temperature conditions. The main part of this gas is formed in the first zone. Further is not quite possible to prevent air from entering into the reaction vessel. Even in small amounts air interferes with the furfural production and the air should therefore be withdrawn before the first reaction stage and for this purpose the valve 9 has been provided. It is, however, not possible to avoid that some furfural bearing vapor is withdrawn through valve 9 and accordingly the gaseous products passing through this valve should be treated in order to extract the furfural therefrom.

The furfural is carried by the vapor stream in the reaction vessel and accordingly a distillation occurs in the vessel. As a consequence of this the concentration of the vapor with regard to furfural is increased as the vapor is streaming from the base to the top of the vessel; whereas the furfural content of the reaction mass is decreasing as the reaction mass is carried downwardly.

As to the further details in FIG. 1 it may be mentioned, that the valve 10 is used for controlling the vapor stream which is blown into the vessel. By the feeding device 11, which is driven by the motor 12 the solid starting material is fed into the reaction vessel and by the discharge devce 13 spent material is discharged from the vessel.

By varying the length of the various sections, the rate of the solid material through the vessel and the amount per unit of time of water vapor blown into the reaction vessel, it is possible to control the process in a manner that each of the reaction stages mentioned above will be located in one individual section of the apparatus. Of course each reaction stage may be further divided into several parts, so that one reaction stage occurs in several sections of the apparatus. In this case it is possible to withdraw the products on several levels within one and the same reaction stage.

In FIG. 2 another embodiment of the apparatus of the present invention is shown. This embodiment is a simplified modification of the apparatus described above and according to this embodiment the reaction vessel 1 is of uniform cross section area or has a somewhat increasing cross section area in the direction from the top to the base. In this reaction vessel there is inserted a pipe 14. The suddenly increasing cross section areas are according to this embodiment obtained at the lower end of the pipe. This pipe on one or several levels may also have suddenly decreasing cross-section areas in the direction from the top to the lower end of said pipe. In all cases the cross section area which remains for the reaction mass is suddenly increased on one or more levels and this has a similar effect as the suddenly increasing cross section area of the reaction vessel according to FIG. 1.

Advantageously the pipe consists of two or more parts which may slide telescopically in each other, and which may be adjustable and this is the embodiment shown in FIG. 2. The pipe with the smaller diameter thereby ending further down in the reaction vessel than the next pipe, into which the former is inserted. The vaporous products are withdrawn at the lower end of each pipe, and are conveyed to a distillation apparatus not shown.

In FIG. 3 there is shown a modification of the apparatus according to FIG. 2 in which all the pipes are concentrically inserted in each other and extended through the top cover of the vessel. In this embodiment it is possible to control the vapor stream through each of the pipes individually by valves placed in each of the vapor outlets.

These last mentioned modifications of the apparatus function in the same way as the embodiment according to FIG. 1 and a reaction vessel according to FIG. 1 could of course, if desirable, be combined with the pipe shown in FIG. 2 or 3.

The process and the apparatus according to the present invention could of course be used in other processes in which it is desirable in dfferent reaction zones to withdraw gaseous or liquid products or by products, especially if these would interfere with the reaction. As an instance of this the production of cellulosic pulp or semi-chemical pulp may be mentioned.

While I have herein described some embodiments of my invention, it is to be understood that many modifications may be made therein departing from the spirit and scope of the appended claims. Thus, with regard to the fact that the raw materials comprise always the water content necessary for the hydrolysis also other gaseous heating media than water vapor may be used.

I claim:
1. Apparatus for the continuous production and recovery of furfural from furfural-yielding solid material by water vapor treatment at elevated temperature and pressure, comprising a substantially vertically disposed reaction vessel of circular cross section throughout its length having cross sectional areas increasing stepwise from top to bottom, said reaction vessel being bounded by top and bottom closures and therebetween by telescopically overlapping collapsible and movable side wall sections forming at each zone of overlap between two such sections a peripheral annular cavity bounded laterally by telescopically overlapping, non-contiguous portions of said wall sections and upwardly by closure means while opening downwardly into the interior of said reaction vessel, a material inlet near the top and a material outlet near the bottom of the reaction vessel, means for continuously feeding fresh furfural-yielding solid material into the reaction vessel through said material inlet, means for continuously discharging spent solid material from said reaction vessel through said material outlet, a vapor outlet communicating with the interior of said reaction vessel adjacent said material inlet, and vapor outlet means communicating with said peripheral annular cavities for promptly withdrawing from each zone of the apparatus the vapors containing furfural substantially immediately after formation thereof.

2. Apparatus as claimed in claim 1 in which said closure means upwardly bounding such peripheral annular cavity is constructed and arranged to permit lengthwise relative adjustment and exchange of said wall sections.

References Cited by the Examiner
UNITED STATES PATENTS

| | | | |
|---|---|---|---|
| 1,566,623 | 12/25 | Singer. | |
| 1,824,282 | 9/31 | Loughrey | 202—257 XR |
| 1,919,878 | 7/33 | Brownlee | 260—347.9 |
| 2,020,948 | 11/35 | Kreis | 202—163 |
| 2,096,353 | 10/37 | Skogh | 260—347.9 |
| 2,369,655 | 2/45 | Boehm | 260—347.9 |
| 2,408,250 | 9/46 | Crites | 183—86 |
| 2,639,224 | 5/53 | McAfee | 23—1 XR |
| 2,689,250 | 9/54 | Natta | 260—347.9 |
| 2,787,519 | 4/57 | Hammar | 23—3 |
| 2,960,449 | 11/60 | Williamson | 202—163 |

FOREIGN PATENTS

| | | |
|---|---|---|
| 643,986 | 9/28 | France. |
| 119,700 | 10/18 | Great Britain. |

OTHER REFERENCES

Hitchcock et al.: Chem. Eng. Progress, vol. 44, No. 9 (1948), pages 669–74.

La Farge et al.: Ind. and Eng. Chem., vol. 15 (1923), page 1057.

MORRIS O. WOLK, *Primary Examiner.*

IRVING MARCUS, WILLIAM B. KNIGHT,
*Examiners.*